United States Patent [19]
Nagai

[11] Patent Number: 5,471,653
[45] Date of Patent: Nov. 28, 1995

[54] PORTABLE RADIO APPARATUS AND MOUNT STRUCTURE THEREFOR

[75] Inventor: Michio Nagai, Tokyo, Japan

[73] Assignee: NEC Corporation, Tokyo, Japan

[21] Appl. No.: 231,058

[22] Filed: Apr. 22, 1994

[30] Foreign Application Priority Data

May 7, 1993 [JP] Japan ................... 5-105794

[51] Int. Cl.[6] .................................. H04B 1/38
[52] U.S. Cl. .................. 455/90; 455/89; 379/433
[58] Field of Search ................. 455/89, 90, 99, 455/128, 345, 346, 348, 351; 379/446, 447, 433, 425, 454, 455

[56] References Cited

U.S. PATENT DOCUMENTS 4,775,083  10/1988  Burger et al. .

FOREIGN PATENT DOCUMENTS

| 0274279 | 12/1987 | European Pat. Off. . | |
| 0580174 | 7/1992 | European Pat. Off. . | |
| 0492748 | 7/1992 | European Pat. Off. | 379/433 |
| 2103427 | 1/1992 | Japan | 379/433 |
| WO93/07680 | 4/1993 | WIPO . | |

*Primary Examiner*—Edward F. Urban
*Assistant Examiner*—Mary M. Lin
*Attorney, Agent, or Firm*—Whitham, Curtis, Whitham & McGinn

[57] ABSTRACT

A portable radio apparatus includes a housing, a receiver unit, a transmitter unit, and a hinge member. The housing has a longitudinally elongated, thin, rectangular parallelepiped shape. The receiver unit is arranged on one surface side of an upper portion of the housing to be located inside the housing. The transmitter unit is arranged on the same surface side of a lower portion of the housing as that of the receiver unit to be located outside the housing. The hinge member pivotally supports an upper end portion of the transmitter unit with respect to the housing. When the transmitter unit is pivoted through a predetermined angle, a lower end portion of the transmitter unit is unfolded to form a mount gap between the lower end portion and the housing.

18 Claims, 5 Drawing Sheets

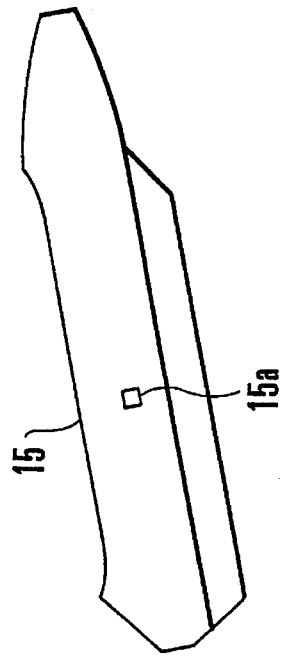
FIG.3A PRIOR ART
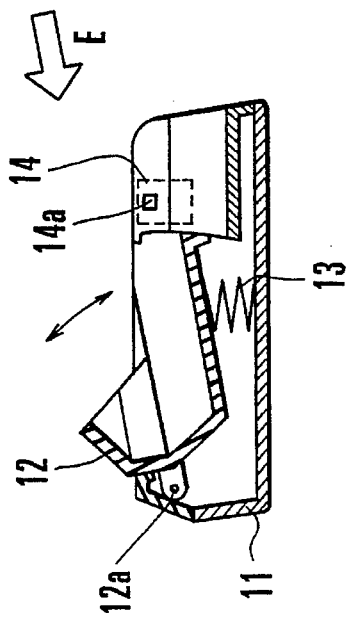
FIG.3B PRIOR ART
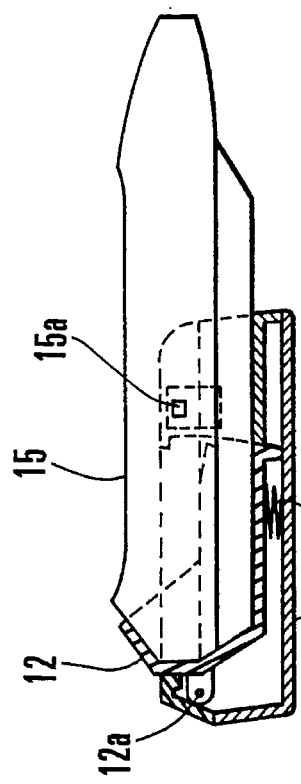
FIG.3C PRIOR ART
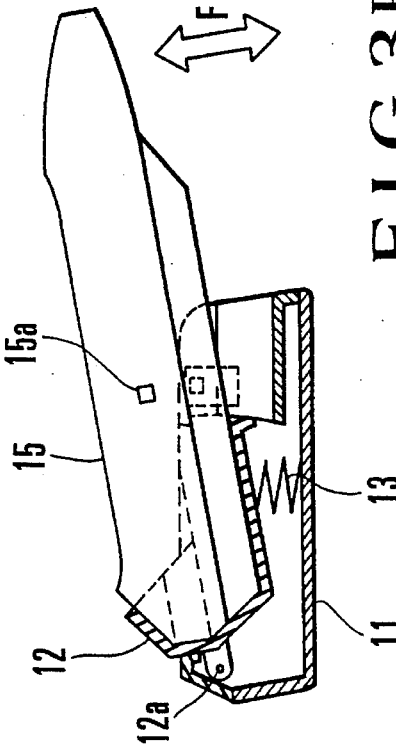

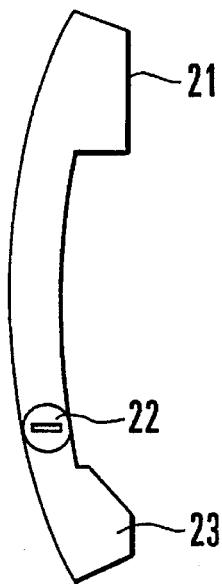
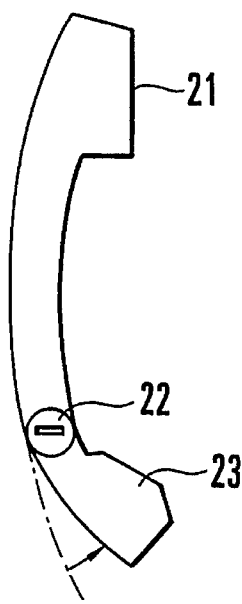
FIG.4A
PRIOR ART
FIG.4B
PRIOR ART
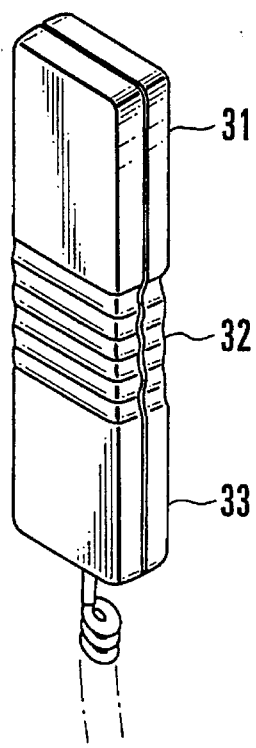
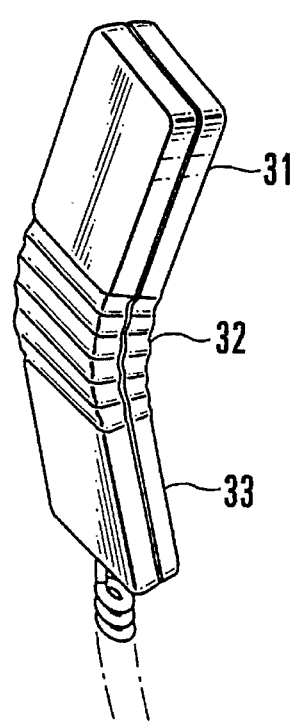
FIG.5A
PRIOR ART
FIG.5B
PRIOR ART

PORTABLE RADIO APPARATUS AND MOUNT STRUCTURE THEREFOR

BACKGROUND OF THE INVENTION

The present invention relates to a portable radio apparatus serving also as a vehicle radio apparatus and, more particularly, to a structure for detachably mounting a portable radio apparatus on a vehicle mount unit or the like.

FIGS. 3A to 6B show several conventional portable radio apparatuses. A first conventional portable radio apparatus 15 which cannot be pivotally bent and the manner of attaching/detaching the portable radio apparatus 15 to/from a mount member 11 will be described below with reference to FIGS. 3A to 3C. Recess portions 15a are formed in the two side surfaces of the portable radio apparatus 15. Release buttons 14, each having a hook 14a, are arranged on the mount member 11 at positions corresponding to the positions of the recess portions 15a in the two side surfaces. In addition, the mount member 11 has a holding portion 12 having a pivot mechanism for pushing the portable radio apparatus 15 upward with a spring 13 so as to cause the apparatus 15 to pivot about a shaft 12a up to a predetermined angle. When the portable radio apparatus 15 is to be mounted on the mount member 11, the apparatus 15 is placed on the holding portion 12, as indicated by an arrow E in FIG. 3A. Thereafter, the portable radio apparatus 15 is pushed in a direction indicated by an arrow F in FIG. 3B to set the apparatus 15 in the state shown in FIG. 3C. In this state, the recess portions 15a are engaged with the hooks 14a of the release buttons 14, thus completing the mounting operation. When the portable radio apparatus 15 is to be detached from the mount member 11, the release buttons 14 are depressed with fingers of a user. As a result, the hooks 14a are removed from the recess portions 15a, and the lock is released. The holding portion 12 is then pushed upward with the spring 13 to pivot about the shaft 12a up to the predetermined angle together with the portable radio apparatus 15, thereby allowing the user to remove the portable radio apparatus 15 from the mount member 11.

FIGS. 4A to 6B show second to fourth conventional portable radio apparatuses which can be pivotally bent and which will be described next with reference to FIGS. 4A to 6B. According to the second conventional apparatus shown in FIGS. 4A and 4B, a receiver portion 21 and a transmitter portion 23 are normally set in a substantially straight line, as shown in FIG. 4A. The transmitter portion 23 can be pivoted about a joint shaft 22. When the apparatus is to be used, the relative angle defined by the receiver portion 21 and the transmitter portion 23 is changed, as shown in FIG. 4B, to facilitate speech communication. According to the third conventional apparatus shown in FIGS. 5A and 5B, a receiver portion 31 and a transmitter portion 33 are normally set in a substantially straight line, as shown in FIG. 5A. A grip portion 32 for coupling the two portions 31 and 33 is made of a flexible material such as rubber. When the apparatus is to be used, the relative angle defined by the receiver portion 31 and the transmitter portion 33 is arbitrarily changed, as shown in FIG. 5B, to facilitate speech communication.

The fourth conventional apparatus shown in FIGS. 6A and 6B is a perfectly foldable apparatus. While the apparatus is not used, a receiver portion 41 and a transmitter portion 43 are folded on each other through a support shaft 42, as shown in FIG. 6A. When the apparatus is to be used, the receiver portion 41 and the transmitter portion 43 are unfolded up to a proper angle, as shown in FIG. 6B, to allow speech communication. However, according to the structures of the second to fourth conventional apparatuses, each apparatus in a pivotal bent state for speech communication cannot be mounted/fixed on a vehicle mount unit without changing the state.

According to the first conventional portable radio apparatus, when the portable radio apparatus 15 is to be removed from the mount member 11, the release buttons 14 must be depressed with fingers of the user. That is, the user needs to perform a very cumbersome operation. In addition, owing to the structure of the mount mechanism, the release buttons 14 used for removing the portable radio apparatus 15 must be arranged on the side surfaces, increasing the width of the mount member 11 accordingly. As a result, the installation property of the mount member 11 deteriorates when it is installed in a vehicle. According to the second to fourth conventional apparatuses, in speech communication, the transmitter portions 23, 33, and 43 and the receiver portions 21, 31, and 41 can be pivotally bent to change their relative angles to the optimal angle for speech communication. In contrast to this, these apparatuses are not designed to be mounted, in a bent state, on vehicle mount units or the like in vehicles which often cause vibration. Therefore, when these apparatuses are connected to the vehicle mount units to be used as vehicle radio apparatuses, they cannot be stably fixed on the units, posing problems in speech communication or damaging the radio apparatuses themselves.

SUMMARY OF THE INVENTION

It is an object of the present invention to provide a portable radio apparatus and its mount structure which allow a user to easily attach/detach the apparatus on a vehicle mount unit.

It is another object of the present invention to provide a portable radio apparatus and its mount structure which improve the installation property and speech performance of a mount mechanism.

In order to achieve the above objects, according to the present invention, there is provided a portable radio apparatus comprising a housing having a longitudinally elongated, thin, rectangular parallelepiped shape, a receiver unit arranged on one surface side of an upper portion of the housing to be located inside the housing, a transmitter unit arranged on the same surface side of a lower portion of the housing as that of the receiver unit to be located outside the housing, and a hinge member for pivotally supporting an upper end portion of the transmitter unit with respect to the housing, wherein when the transmitter unit is pivoted through a predetermined angle, a lower end portion of the transmitter unit is unfolded to form a mount gap between the lower end portion and the housing.

BRIEF DESCRIPTION OF THE DRAWINGS

FIGS. 3A to 3C are sectional views respectively showing the first conventional portable radio apparatus before a mounting operation, in the process of the mounting operation, and after the mounting operation;

FIGS. 4A and 4B are side views respectively showing the second conventional portable radio apparatus before and after it is pivoted;

FIGS. 5A and 5B are perspective views respectively showing the third conventional portable radio apparatus before and after it is pivoted.

DESCRIPTION OF THE PREFERRED EMBODIMENT

Figure 1B:
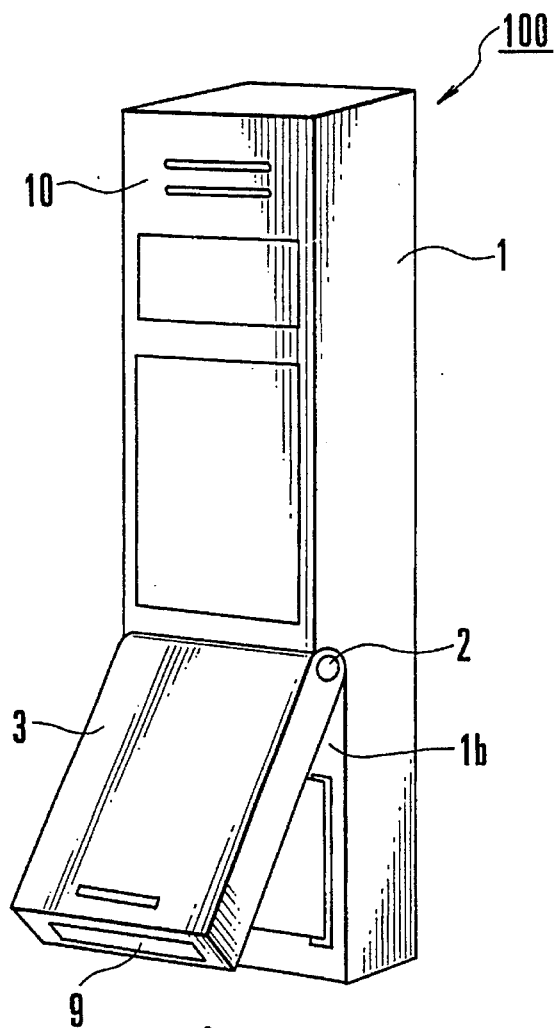
FIG. 1B is a side view of the apparatus.
Figure 1B:
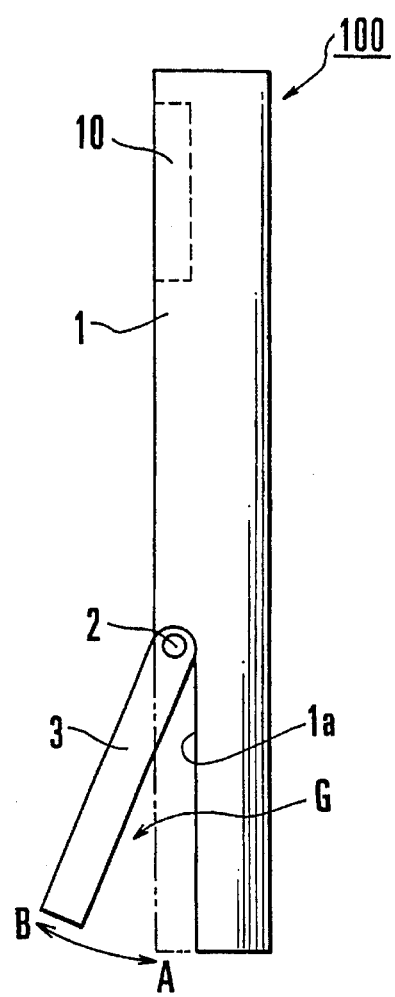
Figure 1A:
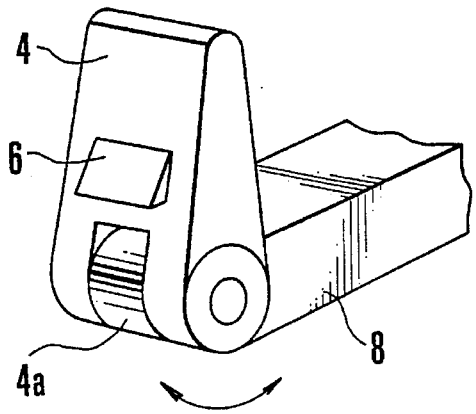
FIG. 1A is a perspective view showing a portable radio apparatus according to an embodiment of the present invention.
Figure 2:
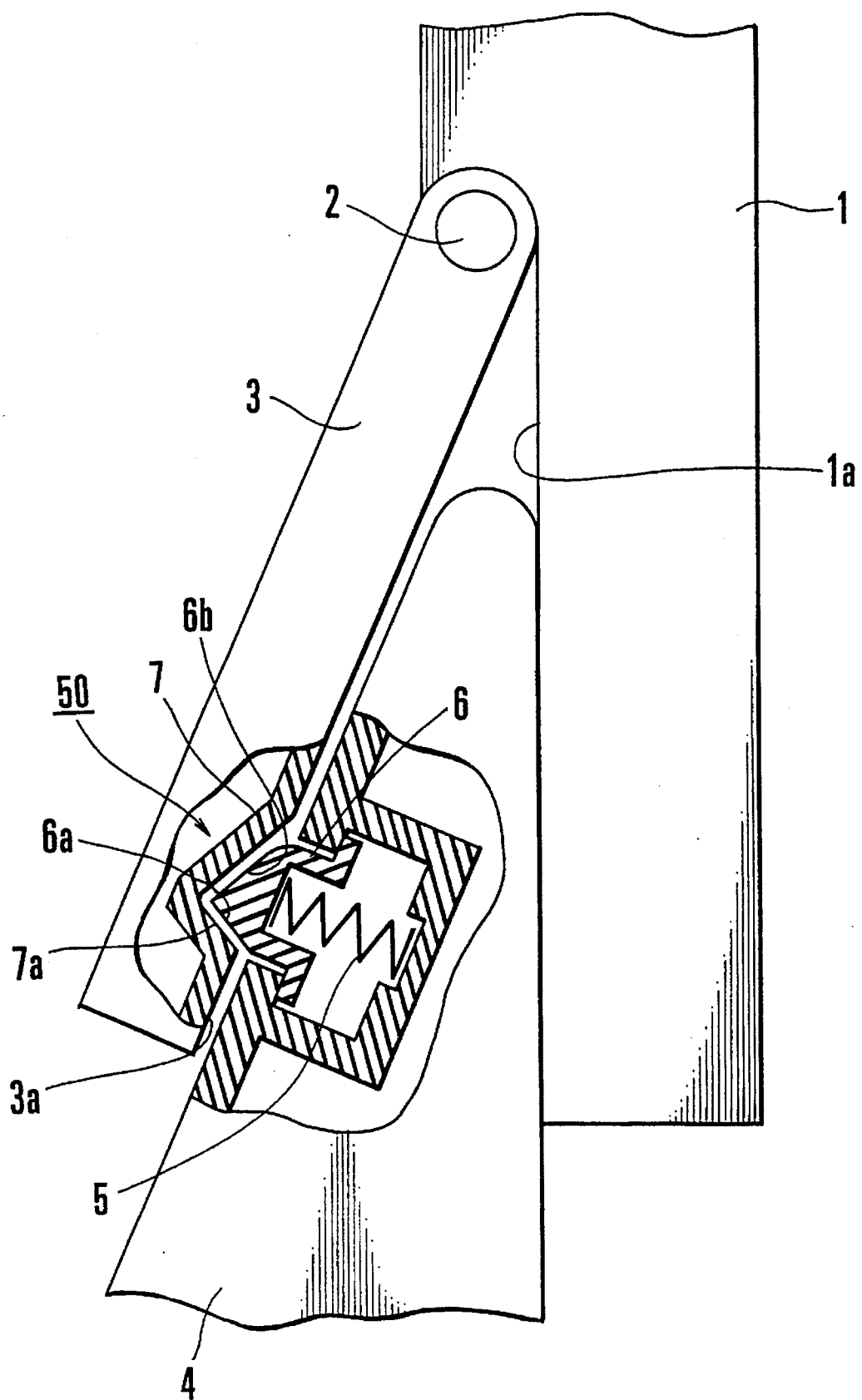
FIG. 2 is a sectional view of the main part of the portable radio apparatus in a mounted state.
Figure 6A:
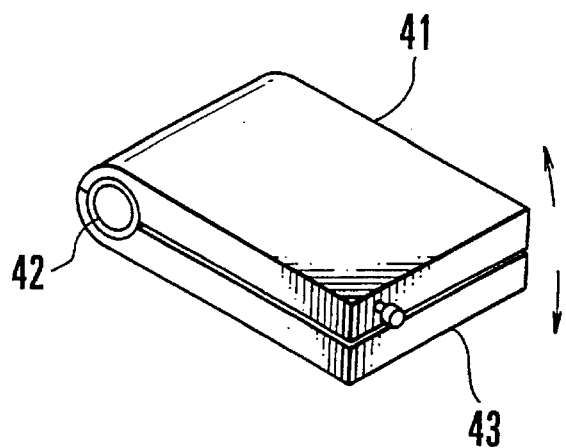
FIGS. 6A and 6B are perspective views respectively showing the fourth conventional portable radio apparatus before and after it is pivoted.
Figure 6B:
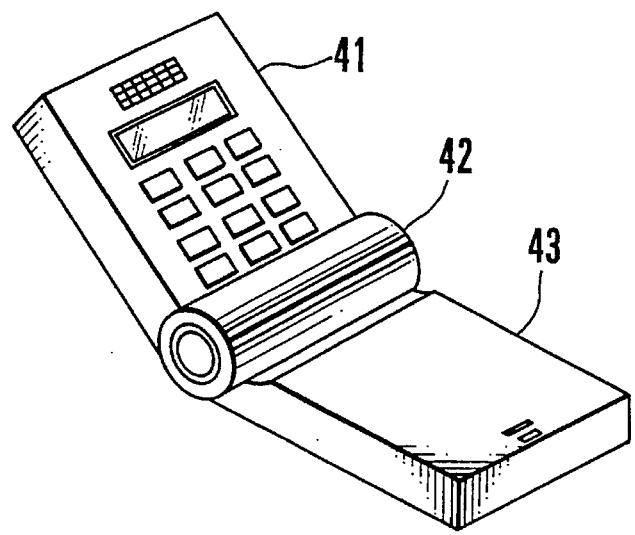

The present invention will be described below with reference to the accompanying drawings. FIGS. 1A and 1B show a portable radio apparatus and its mount structure according to an embodiment of the present invention. FIG. 2 shows the main part of the portable radio apparatus of this embodiment in a mounted state.

In a portable radio apparatus 100 of this embodiment, a receiver portion 10 for receiving a speech signal and a transmitter portion 3 for transmitting a speech signal are arranged in upper and lower portions of a surface of a housing 1 having a columnar shape with a rectangular cross-section or a longitudinally elongated, thin, parallelepiped shape. The transmitter portion 3 has a thick-plate like shape and is designed to be engaged with a stepped portion 1a of the housing 1. The transmitter portion 3 is pivotally supported on the housing 1 via a hinge 2. The transmitter portion 3 is designed to pivot about the hinge 2 to be moved from a position A to a position B respectively indicated by the arrow heads in FIG. 1B. Note that the hinge 2 has a proper frictional force which prevents the transmitter portion 3 from easily returning to the initial position when the user releases his/her grip on the transmitter portion 3 in the process of pivoting it. Therefore, the transmitter portion 3 can be set at an arbitrary resting position between the positions A and B. As described above, the portable radio apparatus 100 is designed such that the receiver portion 10 and the transmitter portion 3 can be relatively pivoted about the hinge 2 to be bent into a substantially V shape. In addition, a connector 9 for connecting the portable radio apparatus 100 to a vehicle mount unit is arranged on the lower end face of the transmitter portion 3.

When the transmitter portion 3 is pivoted to the position B, a triangular gap G is formed between the transmitter portion 3 and the stepped portion 1a of the housing 1, as shown in FIG. 1B. A mount portion 4 is formed into a triangular shape to be fitted in the gap G. The mount portion 4 is pivotally mounted on a fixing base 8, integrally fixed to a vehicle mount unit or the like, via a hinge 4a so that the mount portion 4 can be pivoted/set at an arbitrary position in the direction indicated by an arrow D. As shown in FIG. 2, a lock mechanism 50 is further arranged to firmly engage the mount portion 4 and the transmitter portion 3 with each other when the mount portion 4 is fitted into the gap G between the transmitter portion 3 and the housing 1. More specifically, a recess portion 7 is formed on the transmitter portion 3 side, and a hook 6 to be fitted in the recess portion 7 is formed on the mount portion 4 side to be slidably moved along the lower surface of the transmitter portion 3 with the biasing force of a spring 5, thereby constituting the lock mechanism 50.

The manner of using the portable radio apparatus having the above arrangement will be described below. When the portable radio apparatus 100 is to be used as a portable apparatus for speech communication, the transmitter portion 3 is pivoted about the hinge 2 to an arbitrary angle between the positions A and B to set the portable radio apparatus 100 in a substantially V shape. With this shape, the transmitter portion 3 and the receiver portion 10 are located at the optimal positions for the mouth and ear of the user so that optimal speech communication can be performed without causing any problem. When the portable radio apparatus 100 is to be mounted in the vehicle, the apparatus is connected to the vehicle mount unit via the connector 9 while the transmitter portion 3 is kept pivoted to the position B. With this operation, the portable radio apparatus 100 can be selectively used as a vehicle radio apparatus.

The portable radio apparatus 100 is attached/detached to/from the vehicle by inserting/removing the apparatus in/from the mount portion 4 mounted on a vehicle mount unit or the like. When the portable radio apparatus 100 is to be mounted on the mount portion 4, the transmitter portion 3 is pivoted to the position B, and the gap G between the transmitter portion 3 and the stepped portion 1a of the housing 1 is fitted on the mount portion 4, as indicated by an arrow C in FIG. 1A. In the second half of the process of fitting the portable radio apparatus 100, a distal end portion 3a on the lower surface side of the transmitter portion 3 is brought into contact with an inclined surface 6b of the hook 6, which is inclined upward, to push the hook 6 into the mount portion 4 against the biasing force of the spring 5. When the portable radio apparatus 100 is completely fitted on the mount portion 4, the lock mechanism 50 works such that an inclined surface 6a of the hook 6, which is inclined downward and receives the biasing force of the spring 5, is brought into contact with an inclined surface 7a of the recess portion 7, which is inclined upward, arranged in the transmitter portion 3, as shown in FIG. 2. As a result, the transmitter portion 3 and the mount portion 4 are engaged with each other, and the portable radio apparatus 100 is mounted on the mount portion 4. When the portable radio apparatus 100 is to be removed from the mount portion 4, the apparatus 100 is pulled in the opposite direction to the mounting direction. As a result, the engagement between the hook 6 and the recess portion 7 is released against the biasing force of the spring 5, and the removal of the portable radio apparatus 100 is completed. Note that the user can adjust his/her sense of attaching/detaching the portable radio apparatus 100 or can perform adjustment with respect to the removal of the portable radio apparatus 100 owing to vibration and the like by adjusting the angles of the inclined surfaces 6a and 7a of the hook 6 and the recess portion 7 and setting a clearance. Since the mount portion 4 is mounted on the fixing base 8 via the hinge 4a as a holding member to be pivotal with a predetermined frictional force, the angular position at which the portable radio apparatus 100 is mounted can be set at an arbitrary resting position by pivoting the mount portion 4 through an angle to a position at which the user can easily use the portable radio apparatus 100. As described above, the portable radio apparatus 100 can be easily attached/detached by only inserting/removing it in the direction indicated by the arrow C.

In the above-described embodiment, as the components of the lock mechanism 50 for the transmitter portion 3 and the mount portion 4, the recess portion 7 and the hook 6 are respectively formed on the transmitter portion 3 side and the mount portion 4 side. It is apparent, however, that the recess portion 7 and the hook 6 may be formed on the reverse sides, respectively, or another lock mechanism having a different function and a similar lock function may be used.

As has been described above, according to the present invention, the transmitter portion, which pivots about the hinge portion, is formed on the same surface side of the portable radio apparatus housing as that of the receiver portion, and the apparatus is mounted on the mount member by using the gap formed when the transmitter portion is pivoted up to a predetermined angle. With this arrangement, the apparatus can be easily attached/detached to/from a vehicle mount unit or the like in a vehicle, which often causes vibration, by only inserting/removing the apparatus in/from the mount member, while the conventional function of setting the relative angle defined by the transmitter and receiver portions of the portable ratio apparatus to the optimal angle for speech communication is maintained. Therefore, the apparatus is very easy to operate, and also convenient. In addition, the side of the mount member in the widthwise direction can be reduced to improve the installation property.

What is claimed is:

1. A portable radio apparatus comprising:

a housing having a longitudinally elongated, thin, rectangular parallelepiped shape;

a receiver unit arranged on one side surface of an upper portion of said housing located inside said housing;

a transmitter unit arranged on the same side surface of a lower portion of said housing as that of said receiver unit located outside said housing; and a hinge member for pivotally supporting an upper end portion of said transmitter unit with respect to said housing, wherein when said transmitter unit is pivoted up to a predetermined angle, a lower end portion of said transmitter unit is unfolded to form a mount gap between the lower end portion and said housing, wherein said hinge member has a predetermined frictional force for holding said transmitter unit still at a halfway position in a process of pivoting said transmitter unit, a pivot angle of said transmitter unit with respect to said housing is arbitrarily set by said hinge member having the predetermined frictional force, wherein said transmitter unit has a thick plate shape shape, and a stepped portion is formed on one side surface of said housing to store said transmitter unit such that one surface of said housing and a surface of said transmitter unit constitute the same plane.

2. An apparatus according to claim 1, wherein said hinge member is positioned intermediate a length of said housing.

3. An apparatus according to claim 2, wherein said hinge member is positioned a predetermined distance away from first and second ends of said housing.

4. A mount structure for a portable radio apparatus comprising:

a portable radio apparatus including a housing having a longitudinally elongated, thin, rectangular parallelepiped shape;

a receiver unit arranged on one side surface of an upper portion of said housing located inside said housing;

a transmitter unit arranged on the same side surface of a lower portion of said housing as that of said receiver unit located outside said housing;

a hinge member for pivotally supporting an upper end portion of said transmitter unit with respect to said housing; and a mount member supported on a fixing base, said mount member being fitted in a gap between a lower end portion of said transmitter unit and said housing, which is formed when said transmitter unit is pivoted through a predetermined angle, for allowing mounting of said portable radio apparatus on said mount member, wherein said hinge member has a predetermined frictional force for holding said transmitter unit still at a halfway position in a process of pivoting said transmitter unit, a pivot angle of said transmitter unit with respect to said housing is arbitrarily set by said hinge member having the predetermined frictional force, wherein said transmitter unit has a thick plate shape shape, and a stepped portion is formed on one side surface of said housing to store said transmitter unit such that one surface of said housing and a surface of said transmitter unit constitute the same plane.

5. An apparatus according to claim 4, further comprising a lock mechanism for locking said mount member and said transmitter unit in an engaged state when said mount member is fitted in the gap between said transmitter unit and said housing.

6. An apparatus according to claim 5, wherein said lock mechanism comprises a recess portion formed in a surface, of said transmitter unit, which opposes said housing, a hook member arranged on said mount member and engaged with the recess portion, and a spring member for biasing said hook member in a direction in which the hook member is engaged with the recess portion.

7. An apparatus according to claim 6, wherein the recess portion has at least a first inclined surface which is inclined upwardly, and the hook member has second and third inclined surfaces which are respectively inclined downwardly and upwardly, and wherein a distal end portion of said transmitter unit is brought into contact with the third inclined surface of the hook member to push the hook member into said mount member against a biasing force of the spring member in a second half of a process of fitting said mount member in the gap between said transmitter unit and said housing, and the first inclined surface of the recess portion is brought into contact with the second inclined surface of the hook member with the biasing force of the spring member to engage said transmitter unit with said mount member when fitting of said mount member in the gap is completed.

8. An apparatus according to claim 4, further comprising a holding member for pivotally holding said mount member with respect to the fixing base.

9. An apparatus according to claim 4, wherein said hinge member is positioned intermediate a length of said housing.

10. An apparatus according to claim 9, wherein said hinge member is positioned a predetermined distance away from first and second ends of said housing.

11. A portable radio apparatus comprising:

a housing;

a receiver unit arranged on one side surface of an upper portion of said housing located inside said housing;

a transmitter unit arranged on the same side surface of a lower portion of said housing as that of said receiver unit located outside said housing; and a hinge member for pivotally supporting an upper end portion of said transmitter unit with respect to said housing, wherein when said transmitter unit is pivoted to a predetermined angle, a lower end portion of said transmitter unit is unfolded to form a mount gap between the lower end portion and said housing, wherein said hinge member has a predetermined frictional force for holding said transmitter unit at a halfway position in a process of pivoting said transmitter unit, and a pivot angle of said transmitter unit with respect to said housing is arbitrarily set by said hinge member having the predetermined frictional force, wherein a stepped portion is formed on one side surface of said housing to store said transmitter unit such that one surface of said housing and a surface of said transmitter unit constitute the same plane.

12. An apparatus according to claim 11, wherein said hinge member is positioned intermediate a length of said housing.

13. An apparatus according to claim 12, wherein said hinge member is positioned a predetermined distance away from first and second ends of said housing.

14. An apparatus according to claim 11, further comprising a lock mechanism which a recess portion formed in a surface, of said transmitter unit, which opposes said housing.

15. An apparatus according to claim 14, wherein said lock mechanism further comprises a hook member arranged on said mount member and engaged with the recess portion.

16. An apparatus according to claim 15, wherein said lock mechanism further comprises a spring member for biasing said hook member in a direction in which the hook member is engaged with the recess portion.

17. An apparatus according to claim 16, wherein the recess portion has at least a first inclined surface which is inclined upwardly, and the hook member has second and third inclined surfaces which are respectively inclined downwardly and upwardly.

18. An apparatus according to claim 17, wherein a distal end portion of said transmitter unit is brought into contact with the third inclined surface of the hook member to push the hook member into said mount member against a biasing force of the spring member in a second half of a process of fitting said mount member in the gap between said transmitter unit and said housing, and the first inclined surface of the recess portion is brought into contact with the second inclined surface of the hook member with the biasing force of the spring member to engage said transmitter unit with said mount member when fitting of said mount member in the gap is completed.

* * * * *